Feb. 15, 1949.  I. KALIKOW  2,461,986
DYNAMOELECTRIC MACHINE
Filed Nov. 5, 1947
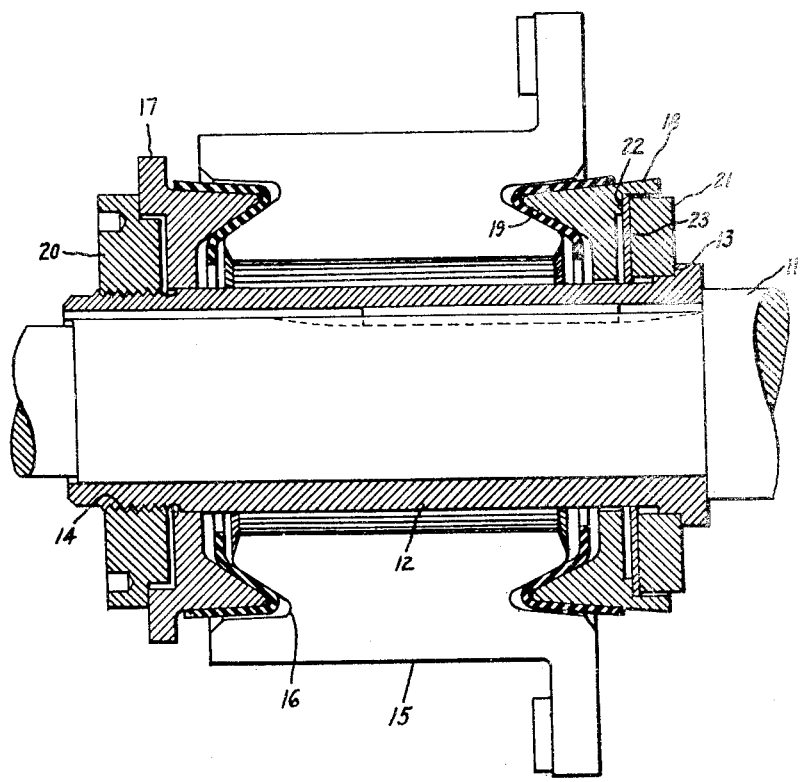
Inventor:
Irving Kalikow,
by Powell S. Mack
His Attorney.

Patented Feb. 15, 1949

2,461,986

UNITED STATES PATENT OFFICE 2,461,986

DYNAMOELECTRIC MACHINE

Irving Kalikow, West Lynn, Mass., assignor to General Electric Company, a corporation of New York Application November 5, 1947, Serial No. 784,097

4 Claims. (Cl. 171—321)

1

My invention relates to improvements in commutators for dynamoelectric machines and more specifically to commutators of the spring ring type.

In making a commutator for a dynamoelectric machine, such as a motor or generator, a general practice has been to provide the commutator segments with V-shaped grooves in their ends. The segments, mutually insulated from each other, are then assembled in the form of a cylinder. In the final assembly the cylinder so formed is gripped by two clamping rings having projecting V-shaped tongues which enter the V-shaped grooves in the segments. Although such rings, often known as V-rings, could be made of insulating material, it is more conventional to make them of steel and separate them from the copper commutator segments by a layer of mica insulation. Conventionally the V-rings ride on a shell portion which is concentric with the shaft of the machine.

Spring rings have been used in such commutator assemblies to place a controlled axial pressure on the V-rings and afford a spring take-up action which will yield according to temperature changes to make allowance for the difference in the co-efficient of thermal expansion of the copper segments and of the steel commutator shell and shaft.

Such a spring ring exerts pressure on one or the other of the V-rings and this V-ring must then be free to move axially along the commutator shell. In the past there has usually been an attempt to maintain concentricity of this movable V-ring with respect to the shell (or the shaft) by providing a tight sliding fit between it and the inner part. If the ring is not concentric then the commutator segments are not concentric, resulting in poor operation and uneven wear of commutator and brushes. Yet, a tight sliding fit between V-ring and commutator shell introduces large frictional forces so that the end ring cannot move properly to take care of axial expansion due to changes of temperature.

An object of my invention is to provide simple and inexpensive means for overcoming the above-mentioned difficulties.

A further object of my invention is to provide an improved commutator construction in which a movable end ring is relieved so that there is no frictional sliding fit between it and other parts while, at the same time, the concentricity of said ring is maintained.

Broadly the means employed in the embodiment herein illustrated and described comprises

2 a flexible centering diaphragm fitting tightly at its outer periphery with said movable V-ring and at its inner periphery with an inner part such as a commutator shell. Other aspects of the invention will appear from consideration of the following description taken in connection with the accompanying drawing.

In the drawing I have shown a sectional view of a commutator assembly suitably embodying my invention as applied to a dynamoelectric machine having a rotatable shaft. Keyed to said shaft so as to be rotatable therewith is an annular commutator shell 12 provided with a shoulder 13 at one end and a threaded portion 14 at the other end. Commutator segments 15 are provided with V-shaped notches 16 at their ends and are held in place by two V-rings, 17 and 18, with insulation 19 interposed between the V-rings and the commutator segments. Means including a nut 20 engaging the threads 14 on the commutator shell and an annular resilient ring 21 biased against shoulder 13 are provided for drawing together said V-rings. The resilient spring ring 21 is made of a flexible material, such as steel, to yieldingly restrain the V-ring members against axial motion relative to each other. This spring ring has a rectangular cross-section and opposite corners of said cross-section engage the shoulder 13 on the shell and a shoulder 22 on the V-ring 18. This V-ring 18 must be made free to move axially along the shell 12 and to accomplish this the inner periphery of ring 18 is made larger than the adjacent outer diameter of the shell. Interposed between spring ring 21 and shoulder 22 of the movable V-ring 18 is a centering washer 23. This centering washer is a diaphragm of a flexible material such as steel and fits tightly between an inner periphery of the movable V-ring and an outer periphery of the commutator shell.

The centering washer allows the movable V-ring to move axially in either direction under the various conditions of commutator operation and, at the same time, preserves exact concentricity of the movable V-ring and, therefore, assures that the commutator segments will not be out of round with respect of the shaft of the machine. It should be noted that the spring ring could not be used by itself to preserve this concentricity, for if it engaged an inner periphery of the movable V-ring it would not spring properly and would not serve its proper function as it must be slightly deformed to give the necessary spring.

Any force that is exerted by the spring ring has, in my improved construction, only to overcome the flexibility of the diaphragm 23 and does not have to overcome frictional resistance between movable V-ring and shell. In conventional constructions, where concentricity has been maintained by a sliding fit between movable end ring and shell, the sliding forces of friction between these members often amount to several tons even in small commutators, and if the V-ring is slightly cocked by uneven mica pressures the friction forces may even be greater than the spring forces. Under such a condition the spring ring is useless.

In my construction, however, there is no frictional resistance between the parts, the movable V-ring riding perfectly centered on the flexible diaphragm. The relatively small amount of axial motion does not disturb this centering alignment and the movable V-ring stays centered under all temperature conditions. There is thus provided a device of the character described capable of meeting the objects hereinabove set forth.

While I have illustrated and described a particular embodiment of my invention, modifications thereof will occur to those skilled in the art. I desire it to be understood, therefore, that my invention is not to be limited to the particular arrangement described and I intend in the appended claims to cover all modifications which do not depart from the spirit and scope of my invention.

What I claim as new and desire to secure by Letters Patent of the United States is:

1. A dynamoelectric machine commutator assembly comprising a plurality of commutator bars, clamping ring members adapted to retain the ends of said bars, means for drawing together said clamping ring members, one of said clamping ring members having an inner bore sufficient to provide a clearance between it and the nearest adjacent part located within said bore, a flexible diaphragm adapted as by fitting within an inner periphery of said last mentioned clamping ring member to center said member, and a resilient ring located axially within said drawing together means to yieldingly restrain said clamping ring members, said resilient ring having a clearance with an inner periphery of said last-mentioned clamping ring member.

2. A dynamoelectric machine commutator assembly comprising a plurality of commutator bars, a commutator shell rotatable with the shaft of said machine, clamping ring members surrounding said shell and adapted to retain the ends of said bars, at least one of said clamping ring members arranged to be freely movable axially along said shell without making contact with said shell, a washer arranged between said freely movable clamping ring member and said shell to center said clamping ring member, and means including a resilient ring for yieldingly restraining said clamping ring members, said resilient ring having a clearance with an inner periphery of said freely movable clamping ring member with diagonally opposite points across the cross section of said resilient ring contacting said clamping ring member and said shell respectively.

3. A dynamoelectric machine commutator assembly comprising a plurality of commutator bars having V-shaped grooves in their ends, a shaft for said machine, a commutator shell arranged to be rotatable with and concentric with said shaft, V-ring members surrounding said shell and adapted to retain the ends of said bars, one of said V-ring members arranged to be freely movable and free from contact with said shell, a centering diaphragm contacting an outer periphery of said shell and contacting an inner periphery of said freely movable V-ring, and means including a spring ring arranged to be free from contact with either of said V-rings and contacting said centering washer for yieldingly restraining said V-ring members.

4. A dynamoelectric machine commutator assembly comprising a plurality of commutator bars having V-shaped grooves in their ends, a shaft for said dynamoelectric machine, a shoulder on said shaft, a commutator shell portion arranged to be rotatable with said shaft and abutting against said shaft shoulder, said shell provided with circumferential threads at one end thereof and a stepped shoulder portion at the other end, V-ring members surrounding said shell and adapted to retain the ends of said bars, insulation interposed between said V-ring members and said bars, a nut adapted to engage said shell threads and to engage one of said V-ring members for the purpose of drawing together said assembly, means including a flexible washer for centering one of said V-ring members, said V-ring member having an inner bore clearance with said shell sufficient to permit it to move axially on said flexible washer without contacting said shell, and means including a spring ring interposed between said flexible washer and said stepped shoulder portion on said shell for yieldingly restraining said V-ring members with respect to one another.

IRVING KALIKOW.

REFERENCES CITED

The following references are of record in the file of this patent:

UNITED STATES PATENTS

| Number | Name | Date |
|--------|------|------|
| 453,822 | Sperry | June 9, 1891 |
| 1,401,708 | Kempton | Dec. 27, 1921 |